E. S. BARTHOLOMEW.
Preserving Process.
No. 60,462.             Patented Dec. 18, 1866.
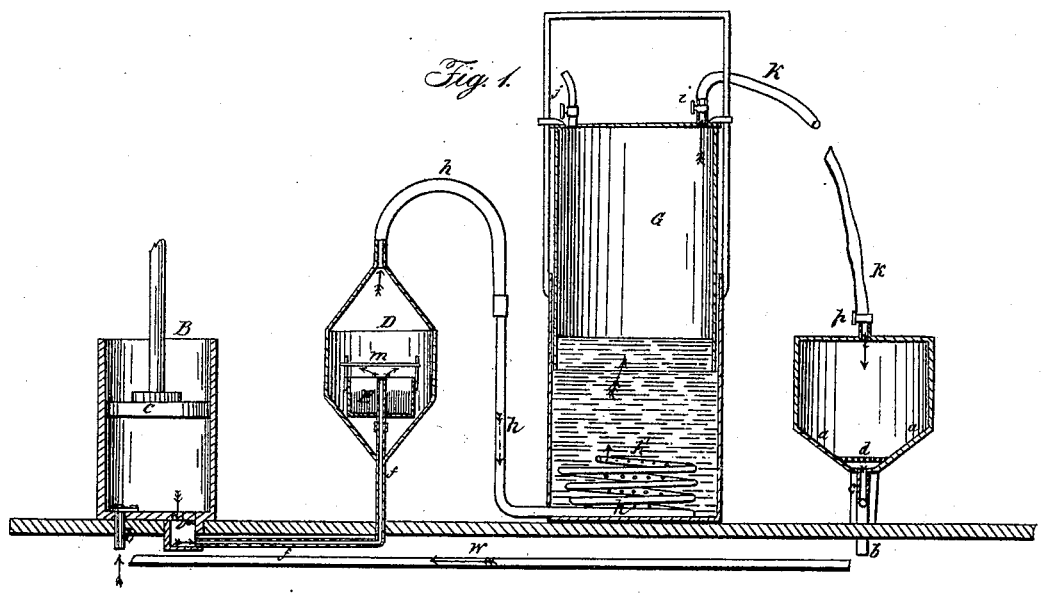
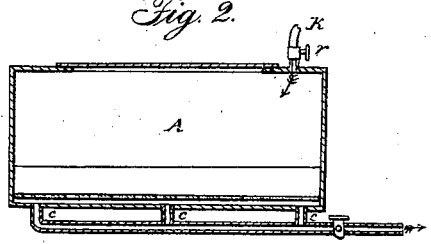
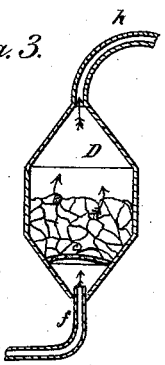
Witnesses:
Jay Hyatt
Louis Fraser
Inventor:
E. S. Bartholomew
by J. Fraser & Co. Attys

United States Patent Office.

IMPROVEMENTS IN PRESERVING FRUITS, MEATS, AND OTHER SUBSTANCES.

E. S. BARTHOLOMEW, OF WESTFIELD, NEW YORK, ASSIGNOR TO HIMSELF AND C. H. BALLOU, OF CLEVELAND, OHIO.

Letters Patent No. 60,462, dated December 18, 1866.

*The Schedule referred to in these Letters Patent and making part of the same.*

TO ALL WHOM IT MAY CONCERN:

Be it known that I, E. S. BARTHOLOMEW, of Westfield, in the county of Chautauqua, and State of New York, have invented a new and improved Method and Apparatus for Preserving Fruits, Meat, and other edible substances; and I do hereby declare that the following is a full and exact description thereof, reference being had to the accompanying drawings, in which—

Figure 1 is a vertical section of the apparatus which I employ.

Figure 2 is a longitudinal section of the preserving chamber A detached.

Figure 3 is a detached section of the retort D.

Like letters designate corresponding parts in all of the figures.

My invention has for its object the preservation of edibles by completely depriving the vessels containing them of oxygen, and immersing them in an atmosphere of inert gases, such as nitrogen and carbonic acid; and the apparatus which I employ consists of a hermetical vessel to contain the edibles for preservation; an air pump connected therewith for exhausting the air, which is driven by the pump through a retort containing ignited charcoal or other combustible matter; and from this the gases of combustion are made to pass into a receiver, where they are purified and introduced into the edible or preserving chamber, displacing any remaining air not removed by the pump. Scientific investigation has proved that the decomposition of substances used as food is due mainly to the presence of the oxygen of the atmosphere, which is absorbed and (especially in the case of fruits) attacks first the soluble principles, which disappear by a slow process of combustion or fermentation, in which carbonic acid is exhaled, and progressing through its various stages to the final decomposition of the matter. Thus, oxygen being the active agent of destruction, and ever present in the atmosphere, the resort to low temperature, to absence of light, and desiccation, as a means of preservation, only protract the process of decomposition, which they entirely fail to prevent. The purpose of my process and apparatus is, therefore, to effect the entire removal of the oxygen; and to accomplish this fully and cheaply, and sustain that condition indefinitely without the cost of maintaining a vacuum, I replace the space occupied by the oxygen with gases, which, being inert, exercise no injurious effect upon the food. The method of applying and working my apparatus will be understood from the following description:

As represented in the drawings, A (figs. 1 and 2) is the preserving chamber in which the food is placed. It may be made of any convenient size and shape, but is perfectly elongated horizontally; and the bottom, instead of being flat, is formed with two inclined or converging sides, $a$ $a$, with two or more tubes, $c$ $c$, extending downwards and connecting with an exhaust tube $b$. A perforated or false bottom, $d$, is placed over the outlet tubes $c$ $c$, and suitable racks or shelves may be used to receive the articles for preservation. C is the piston and rod of the air pump, of which $l$ is the induction and $f$ the eduction pipe, which terminates in the bottom of the retort D, shown separate in fig. 3. The retort is provided with a perforated false bottom or grating, $e$, fig. 3, on which charcoal is placed and ignited when the retort is closed air-tight, it being provided with a suitable cover or door for the purpose. From the top of the retort the tube $h$ is carried to the bottom of the receiver and purifier G, where it terminates in the perforated coil or worm $h'$. The perforations in this coil are very minute, and have an inclined direction, but alternating, the object being to discharge the gas in small jets which cross each other, to prevent the formation of large bubbles of gas in passing through the liquid contained in the receiver, which may be either water alone or water containing an alkali solution, the object being to wash the gases and deprive them of any deleterious properties which might corrode or impart a bad flavor to the food. The receiver, G, consists of two cylinders, open at one end, the upper inverted within the other, so that its open end is immersed in the liquid, on the principle of gas-holders generally. At the top of the upper portion a stop-cock, $i$, is provided, and from it an elastic tube, K, connects with the preserving chamber A. Another stop-cock, $j$, is provided at the top of the receiver, for the purpose of testing the nature of the gases contained in the receiver. In commencing the operation, after igniting the charcoal in the retort D, it should be left open, and the pump worked until all smoke disappears, when it is closed, and the resulting gases conveyed to the receiver. If the gases are found not to be pure, the flexible tube $w$ is connected with the stopcock $j$ and induction pipe $l$, and the contents of the receiver G are withdrawn and again passed through the combustion retort by the action of the pump; which process may be repeated until the oxygen is entirely consumed. It will be seen by this arrangement that I first fill the receiver with gas, then connect the preserving chamber A with air pump B by elastic tube $w$ attached to pipe $b$ and induction pipe $l$, and open stop-cocks $i$ and $r$ to admit the gas from the receiver into the preserving chamber. By the working of the pump the air is exhausted from the preserving chamber A, forced through the fire in the retort, which is opened during this part of the process. The working of the pump is continued as long as there is sufficient oxygen in the air, taken from the chamber A, to sustain combustion in the retort, the expiring of the fire in which affords a reliable test that the oxygen is entirely consumed. When this occurs, the stop-cocks in the pipes connecting with the preserving chamber are shut off, excluding air from entering, and retaining the gases formed by the combustion. In some cases, especially in the preservation of meats, it is beneficial to introduce a small portion of sulphurous acid gas with the other gases in the preserving chamber, which is accomplished by substituting the sulphur lamp E, fig. 1, for the charcoal fire in the retort, and connecting the flexible pipe $k$ with the joint of pipe $h$. In using the sulphur lamp, fill the chamber or cup E with a cotton wick dipped in melted sulphur to saturation; adjust cap $m$ to within one-quarter or three-eighths of an inch above the wick; remove from the retort any charcoal remaining, and take out the diaphragm $e$; place tube $o$ of lamp into pipe $f$, and ignite the sulphur wick; close the retort, and proceed as in the use of charcoal. The resulting gases will be nitrogen and sulphurous acid; the sulphurous acid uniting with the alkali in solution in the receiver G, forming a sulphate of the alkali used, leaving pure nitrogen in the receiver, as in the use of charcoal. The use of the cap $m$ in the lamp is for the purpose of diffusing the air and driving it through the flame, thereby making the combustion complete. The object of having the bottom of the preserving chamber angular or curved is to avoid the possibility of air containing oxygen remaining, as it would in an acute-angle or right-angled bottom, by currents being formed across the angle, leaving more or less oxygen. The air in the chamber may be removed by dry displacement. By opening stop-cock in pipe $k$, and also opening stop-cocks in pipe $b$, and putting weights on receiver G, the gas will be forced into the preserving chambers. Nitrogen being specifically lighter than common air, it will seek the upper portion of the chamber, thereby forcing the air out of pipes $c$ $c$ until it is all perfectly removed.

What I claim as my invention, and desire to secure by Letters Patent, is—

1. The combination of the air pump B, and close combustion retort D, receiver and purifier G, provided with the perforated coil $h'$, with hermetical preserving chamber A, arranged and operating substantially as set forth.

2. I also claim a preserving chamber, formed with inclined or converging sides $a$ $a$, in combination with the several eduction pipes $c$ $c$ and main eduction pipe $b$, when used in combination with an exhausting pump, B, or equivalent, substantially for the purpose described.

3. I also claim the sulphurous acid gas generator E, in combination with the retort D and induction tube $f$, when used in connection with the air pump, or equivalent, for the purpose described.

4. I also claim the employment of sulphurous acid gas in preserving meats, by injecting a small percentage thereof into the preserving chamber, in combination with the nitrogen and carbonic acid gases, substantially as set forth.

E. S. BARTHOLOMEW.

Witnesses:
   J. T. CARLISLE,
   S. B. LOOK.